(12) United States Patent
Marvel et al.

(10) Patent No.: US 11,133,721 B2
(45) Date of Patent: Sep. 28, 2021

(54) ELECTROMAGNETIC COUPLING FOR ESP MOTOR

(71) Applicant: GE Oil & Gas ESP, Inc., Oklahoma City, OK (US)

(72) Inventors: Robert Lee Marvel, Oklahoma City, OK (US); Rene Jose Garcia, Moore, OK (US)

(73) Assignee: Baker Hughes ESP, Inc., Houston, TX (US)

(*) Notice: Subject to any disclaimer, the term of this patent is extended or adjusted under 35 U.S.C. 154(b) by 392 days.

(21) Appl. No.: 15/392,416

(22) Filed: Dec. 28, 2016

(65) Prior Publication Data

US 2017/0194831 A1    Jul. 6, 2017

Related U.S. Application Data

(60) Provisional application No. 62/272,674, filed on Dec. 30, 2015.

(51) Int. Cl.
*H02K 1/22* (2006.01)
*H02K 5/132* (2006.01)
(Continued)

(52) U.S. Cl.
CPC .......... *H02K 5/132* (2013.01); *E21B 43/128* (2013.01); *F04D 13/06* (2013.01); *F04D 13/08* (2013.01);
(Continued)

(58) Field of Classification Search
CPC .......... H02K 16/02; H02K 1/22; H02K 5/132; H02K 7/11; H02K 7/14; H02K 9/10;
(Continued)

(56) References Cited

U.S. PATENT DOCUMENTS 4,126,406 A * 11/1978 Traylor ............... E21B 36/003
310/64
6,388,347 B1 * 5/2002 Blake ..................... F16C 19/50
310/266
(Continued)

FOREIGN PATENT DOCUMENTS

| EP | 1 931 016 A2 | 6/2008 |
|---|---|---|
| KR | 2000-0059364 A | 10/2000 |
| NL | 7804329 A | 10/1979 |

OTHER PUBLICATIONS

International Search Report and Written Opinion issued in connection with corresponding PCT Application No. PCT/US2016/069367 dated Apr. 13, 2017.

*Primary Examiner* — Thienvu V Tran
*Assistant Examiner* — Lorena D Bruner
(74) *Attorney, Agent, or Firm* — Crowe & Dunlevy, P.C.

(57) ABSTRACT

A pumping system deployable in a wellbore includes a primary driven component, a secondary driven component and a motor. The motor is filled with a motor lubricant and includes a stator, a primary rotor assembly configured for rotation within the stator and a primary shaft connected to the primary rotor assembly and to the primary driven component. The motor further includes an internal magnetic coupling assembly inside the stator. The internal magnetic coupling assembly includes a secondary rotor assembly and a secondary shaft. The secondary rotor assembly and the secondary shaft are isolated from the motor fluid.

15 Claims, 2 Drawing Sheets

(51) Int. Cl.
*F04D 29/10* (2006.01)
*F04D 13/10* (2006.01)
*F04D 13/08* (2006.01)
*F04D 13/06* (2006.01)
*H02K 16/02* (2006.01)
*E21B 43/12* (2006.01)
*H02K 7/11* (2006.01)
*H02K 7/14* (2006.01)
*H02K 9/10* (2006.01)

(52) U.S. Cl.
CPC ............. *F04D 13/10* (2013.01); *F04D 29/10* (2013.01); *H02K 1/22* (2013.01); *H02K 7/11* (2013.01); *H02K 7/14* (2013.01); *H02K 9/10* (2013.01); *H02K 16/02* (2013.01)

(58) Field of Classification Search
CPC ........ H02K 49/04; H02K 7/003; H02K 16/00; H02K 9/00; H02K 9/19; H02K 9/197; F04D 13/06; F04D 13/08; F04D 13/10; F04D 29/10; E21B 43/128
USPC .......................................................... 310/87
See application file for complete search history.

(56) References Cited

U.S. PATENT DOCUMENTS

| | | | |
|---|---|---|---|
| 6,769,487 B2 | 8/2004 | Hache | |
| 6,911,752 B1 | 6/2005 | Breit et al. | |
| 7,687,966 B2 * | 3/2010 | Takahashi | H02K 1/187 |
| | | | 310/215 |
| 7,851,962 B1 * | 12/2010 | Williams | H02K 16/04 |
| | | | 310/113 |
| 8,283,818 B2 | 10/2012 | Hassett et al. | |
| 8,777,596 B2 * | 7/2014 | Cunningham | F04D 13/10 |
| | | | 417/423.3 |
| 9,759,051 B2 * | 9/2017 | Twidale | F04C 15/008 |
| 10,301,915 B2 * | 5/2019 | Collins | H02K 7/14 |
| 2013/0091878 A1 | 4/2013 | Jankowski et al. | |

* cited by examiner

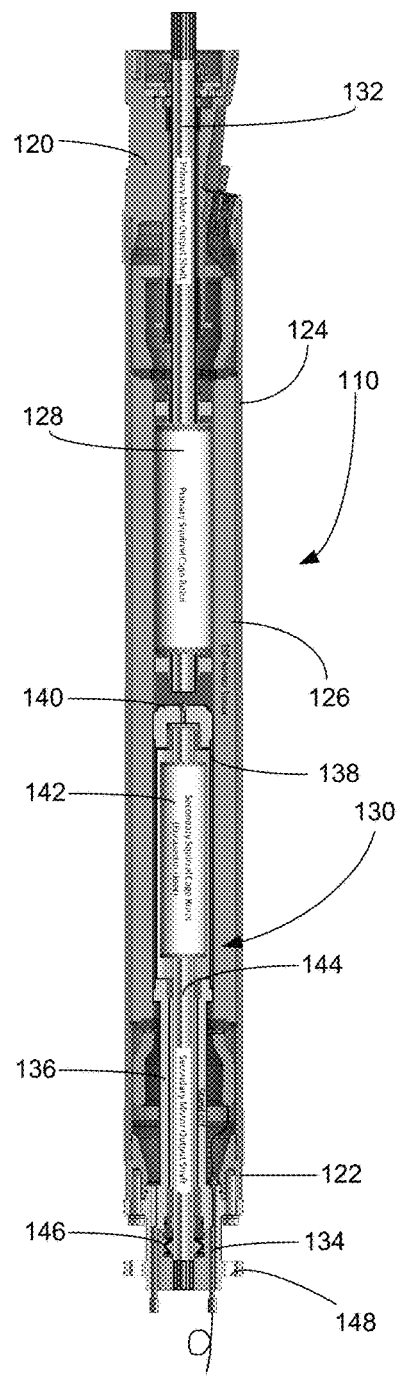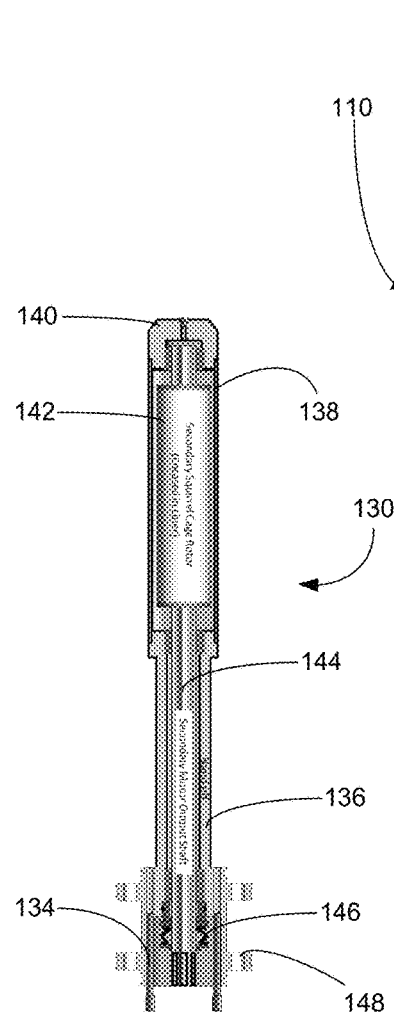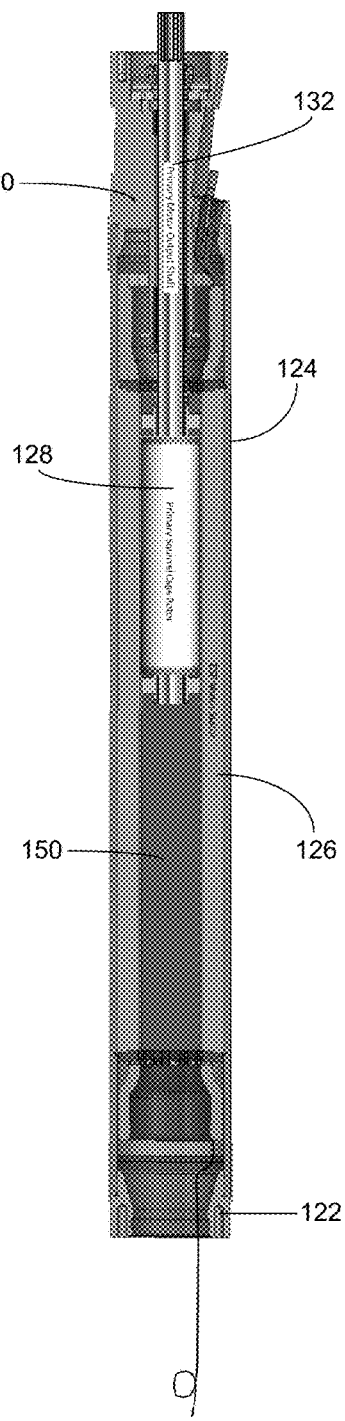
FIG. 2
FIG. 3
FIG. 4

ELECTROMAGNETIC COUPLING FOR ESP MOTOR

RELATED APPLICATIONS

This application claims the benefit of U.S. Provisional Patent Application No. 62/272,674 filed Dec. 30, 2015, entitled "Electromagnetic Coupling for ESP Motor," the disclosure of which is herein incorporated by reference.

FIELD OF THE INVENTION

This invention relates generally to the field of submersible pumping systems, and more particularly, but not by way of limitation, to an electromagnetic coupling for use in a motor within an electric submersible pumping system.

BACKGROUND

Submersible pumping systems are often deployed into wells to recover petroleum fluids from subterranean reservoirs. Typical submersible pumping systems include a number of components, including one or more fluid filled electric motors coupled to one or more high performance pumps located above the motor. When energized, the motor provides torque to the pump, which pushes wellbore fluids to the surface through production tubing. Each of the components in a submersible pumping system must be engineered to withstand the inhospitable downhole environment.

In some applications, it is desirable to employ an electric motor that includes two output shafts. A primary shaft is often used to drive a large production pump that forces wellbore fluids to the surface. A secondary shaft can be used to drive another production pump or an auxiliary component within the pumping system, such as a gas separator or compressor.

Typical motors used in electric submersible pumping systems include one or more segmented rotors that are placed inside stators that occupy substantially the entire length of the motor. The rotors are keyed to one or more shafts that extend from the motor into an adjacent component of the electric submersible pumping system. The stator includes stator coils extending through a stator core that is formed by stacking and pressing a number of thin laminates to create an effectively solid core. The stator coils are formed by extending magnet wire through slots in each laminate of the stator core.

The motor is typically filled with a dielectric fluid. To prolong the operational life of the motor, it is desirable to isolate the motor fluid from corrosive fluids from the wellbore. In the past, mechanical shaft seals have been used to limit the contamination of the motor fluid at the point in which the shaft extends from the motor into an adjacent component. Although widely adopted, portions of the mechanical seal may wear over time, fail, and permit the contamination of the motor fluid. There is, therefore, a need for an improved electric submersible pumping system motor that provides improved durability and resistance to contamination of the motor fluid.

SUMMARY OF THE INVENTION

In one aspect, the present invention includes a pumping system deployable in a wellbore that includes a primary driven component, a secondary driven component and a motor. The motor is filled with a motor lubricant and includes a stator, a primary rotor assembly configured for rotation within the stator and a primary shaft connected to the primary rotor assembly and to the primary driven component. The motor further includes an internal magnetic coupling assembly inside the stator. The internal magnetic coupling assembly includes a secondary rotor assembly and a secondary shaft. The secondary rotor assembly and the secondary shaft are isolated from the motor fluid.

In another aspect, the present invention includes a motor for use in a pumping system that includes a stator, a primary rotor assembly configured for rotation within the stator, a primary shaft connected to the primary rotor assembly and an internal magnetic coupling assembly inside the stator. The internal magnetic coupling assembly includes a secondary rotor assembly and a secondary shaft.

BRIEF DESCRIPTION OF THE DRAWINGS

FIG. 2 is a cross-sectional depiction of the motor of the pumping system of FIG. 1.

FIG. 3 is a cross-sectional depiction of the internal magnetic coupling assembly of the motor of FIG. 2.

FIG. 4 is a cross-sectional depiction of the motor of the pumping system of FIG. 1 with the internal magnetic coupling assembly removed.

WRITTEN DESCRIPTION

Figure 1:
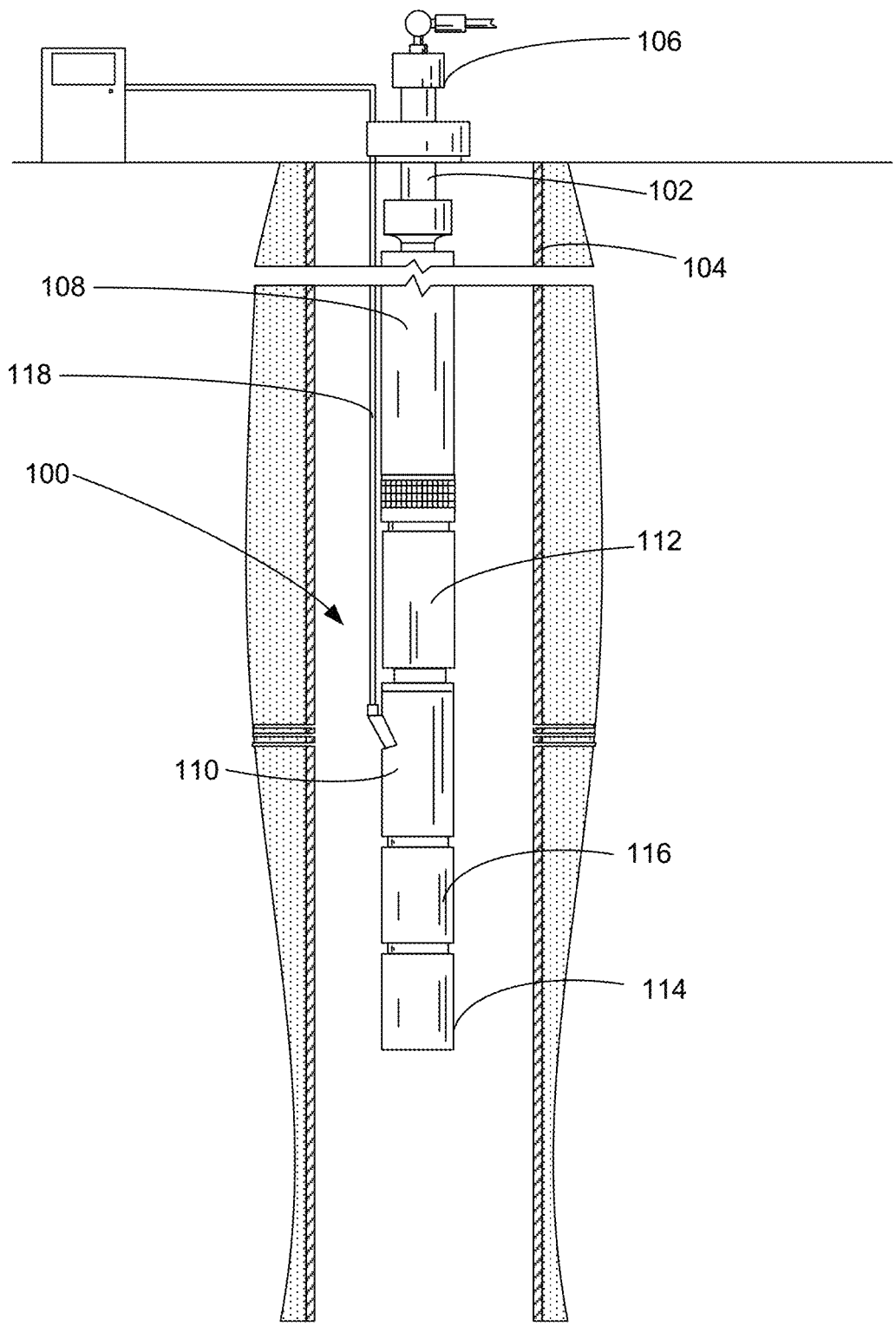
FIG. 1 is an elevational view of the submersible pumping system constructed in accordance with an exemplary embodiment.

FIG. 1 shows an elevational view of a pumping system 100 attached to production tubing 102. The pumping system 100 and production tubing 102 are disposed in a cased wellbore 104, which is drilled for the production of a fluid such as water or petroleum. As used herein, the term "petroleum" refers broadly to all mineral hydrocarbons, such as crude oil, gas and combinations of oil and gas. The production tubing 102 connects the pumping system 100 to a wellhead 106 located on the surface.

The pumping system 100 includes a primary driven component 108, a motor 110, a seal section 112, a secondary driven component 114 and a heat exchanger 116. The motor 110 is an electric motor that receives its power from a surface-based supply through a power cable 118. As depicted in FIG. 1, the primary driven component 108 is a production pump that forces fluid from the wellbore 104 to the surface. The secondary driven component 114 is a compressor that reduces the volume of gas in the wellbore fluids to improve the efficiency of the primary driven component 108. Although demonstrated in a vertical wellbore 104, it will be appreciated that pumping system 100 may also be implemented in horizontal and non-vertical wellbores.

The seal section 112 shields the motor 110 from axial thrust loading produced by the primary driven component 108 and prevent the ingress of wellbore fluids into the motor 110 from the primary driven component 108. The seal section 112 may also accommodate expansion and contraction of lubricants within the motor 110 and may include one or more fluid separation mechanisms. The fluid separation mechanism may include pistons, bag seals, labyrinth seals and expansible bellows.

The heat exchanger 116 provides a closed-circuit cooling system for removing heat from the motor 110. Hot motor fluid from the motor 110 is circulated through the heat exchanger 116, where it is cooled and then returned to the motor 110. The heat exchanger 116 may use fluids from the wellbore to absorb heat carried by the motor fluid from the motor 110. Because the motor 110 is cooled without relying on external convective cooling, the motor 110 can be operated in environments with reduced fluid flow around the motor 110. The use of the heat exchanger 116 may find particular utility in situations where the motor 110 is placed below the perforations in the wellbore 104 or in marginal wells that do not produce sufficient fluid volume for external convective cooling. Although the heat exchanger 116 is depicted in FIG. 1 between the motor 110 and the secondary driven component 114, the heat exchanger 116 may be placed in other locations within the pumping system 100.

Turning to FIG. 2, shown therein is a cross-sectional depiction of the motor 110. The motor 110 includes a head 120, a base 122 and a housing 124. The housing 124 encompasses and protects the internal portions of the motor 110 and is sealed to reduce the entry of wellbore fluids into the motor 110. The motor includes a stator 126 contained within the housing 124, a primary rotor assembly 128 and an internal magnetic coupling assembly 130. When subjected to rotating magnetic fields produced by sequenced commutation states of the stator 126, the primary rotor assembly 128 rotates in accordance with well-known electromagnetic principles. The primary rotor assembly 128 is connected to a primary shaft 132 that extends from the motor 110 and carries torque into the primary driven component 108 of the pumping system 100. Although a single primary rotor assembly 128 is depicted in FIG. 2, it will be appreciated that the primary rotor assembly 128 may include multiple segmented rotor sections.

The internal magnetic coupling assembly 130 and base 122 are depicted in FIGS. 2 and 3. The internal magnetic coupling assembly 130 is a self-contained, sealed assembly that is contained within the stator 126 and base 122 of the motor 110. The internal magnetic coupling assembly 130 includes a stand off 136, a liner 138, a cap 140, a secondary rotor assembly 142 and a secondary shaft 144. The cap 140 fits within the interior space of the stator 126 and closes the interior end of the liner 138. The liner 138 extends alongside the interior surface of the stator 126. An interior end of the stand off 136 is connected to the exterior end of the liner 138. An exterior end of the stand off 136 is held in a sealed relationship with the base 122. The internal magnetic coupling assembly 130 may also include a connecting flange 148 attached to the lower end of the stand off 136 for connecting an adjacent component within the pumping system 100.

In this way, the cap 140, liner 138, stand off 136 and connecting flange 148 form a sealed, stationary barrier around the secondary rotor assembly 142 and secondary shaft 144 to place these components in fluid isolation from the balance of the motor 110. Hydraulic ports 134 within the connecting flange 148 permit the exchange of motor fluid around the outside of the internal magnetic coupling assembly 130 with an adjacent component without compromising the barrier around the secondary rotor assembly 142 and secondary shaft 144. The connecting flange 148 may also be configured to pass sensor signals and electrical power between the motor 110 and adjacent components within the pumping system 100. The signal and power wires can be routed through a dedicated pass-through in the connecting flange 148 or alternatively through one or more of the hydraulic ports 134. The internal magnetic coupling assembly 130 can be advantageously positioned within an unoccupied rotor space 150 within the motor 110 (as illustrated in FIG. 4).

The secondary rotor assembly 142 rotates within the internal magnetic coupling assembly 130 in response to the rotating magnetic fields produced by sequenced commutation states of the stator 126. The secondary rotor assembly 142 is connected to the secondary shaft 144, which extends through the stand off 136 and beyond the motor 110 to the secondary driven component 114. Although a single secondary rotor assembly 142 is depicted in FIGS. 2 and 3, it will be appreciated that the secondary rotor assembly 142 may include multiple segmented rotor sections.

Portions of the motor 110 are filled with motor fluid that exhibits favorable lubricating, dielectric and specific heat properties. The motor fluid permeates the primary rotor assembly 128, the stator 126 and the voids between the stator 126 and the internal magnetic coupling assembly 130. In the embodiment depicted in FIGS. 1 and 2, the hydraulic ports 134 carry the motor fluid from the motor 110 to the heat exchanger 116 and from the heat exchanger 116 back to the motor 110.

The internal magnetic coupling assembly 130 is filled with a suitable lubricant. As depicted in FIGS. 2 and 3, the lubricant is contained within the internal magnetic coupling assembly 130 by a secondary shaft seal 146. The secondary shaft seal 146 isolates the lubricant within the internal magnetic coupling assembly 130 from any wellbore fluids present in the adjacent component within the pumping system 100. Notably, in the event the secondary shaft seal 146 is compromised, any migration of contaminated fluids through the secondary shaft seal 146 would be contained within the internal magnetic coupling assembly 130 and not passed into the other portions of the motor 110.

In other embodiments, the internal magnetic coupling assembly 130 is connected to a lower seal section that accommodates the expansion and contraction of the fluid within the internal magnetic coupling assembly 130. In yet other embodiments, the internal magnetic coupling assembly 130 can be connected to an external heat exchanger to control the temperature of the internal lubricating fluid within the internal magnetic coupling assembly 130. It will be further appreciated that the internal magnetic coupling assembly 130 will also find utility in applications that do not include the heat exchanger 116 or applications in which the heat exchanger 116 is located elsewhere in the pumping system 100.

Thus, the internal magnetic coupling assembly 130 provides an efficient mechanism for transferring torque to the secondary driven component 114 while isolating the balance of the motor 110 from any wellbore fluids that are present at the interface between the motor 110 and the secondary driven component 114.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A motor for use in a pumping system, the motor comprising:

a stator;
a primary rotor assembly configured for rotation within the stator, wherein the primary rotor assembly is surrounded by a first motor lubricant;
a primary shaft connected to the primary rotor assembly; and
an internal magnetic coupling assembly inside the stator, wherein the internal magnetic coupling assembly comprises:
  a secondary rotor assembly, wherein the second rotor assembly is surrounded by a second motor lubricant;
  a secondary shaft, connected to the secondary rotor assembly; and
  an impermeable liner in contact with the surface of the stator, wherein the impermeable liner isolates the second motor lubricant from the first motor lubricant.

2. The motor of claim 1, wherein the internal magnetic coupling assembly further comprises:
a stand off connected to the liner.

3. The motor of claim 2, wherein the secondary rotor assembly is located within the liner.

4. The motor of claim 2, wherein the secondary shaft is located within the stand off.

5. The motor of claim 2, further comprising a cap connected to the liner.

6. A pumping system deployable in a wellbore, the pumping system comprising:
a primary driven component, wherein the primary driven component is a pump configured to move a wellbore fluid;
a secondary driven component, wherein the secondary driven component is a compressor that is configured to remove gas from the wellbore fluid;
a heat exchanger; and
a motor, wherein the motor is filled with a motor lubricant that is circulated through the heat exchanger and wherein the motor comprises:
  a stator;
  a primary rotor assembly configured for rotation within the stator;
  a primary shaft connected to the primary rotor assembly and to the primary driven component; and
  an internal magnetic coupling assembly inside the stator, wherein the internal magnetic coupling assembly comprises:
    a secondary rotor assembly;
    a secondary shaft connected between the secondary rotor assembly and the secondary driven component; and
    wherein the secondary rotor assembly and the secondary shaft are isolated from the motor lubricant.

7. The pumping system of claim 6, further comprising a heat exchanger connected to the motor that reduces the temperature of the motor fluid.

8. The pumping system of claim 6, wherein the motor further comprises:
a head;
a base; and
a housing connected between the head and the base.

9. The pumping system of claim 8, wherein the internal magnetic coupling assembly comprises:
a liner in contact with an interior surface of the stator;
a stand off connected between the liner and the base.

10. The pumping system of claim 9, wherein the secondary rotor assembly is located within the liner and wherein the secondary shaft is located within the stand off.

11. A motor for use in a pumping system, the motor comprising:
a stator, wherein the stator contains a motor fluid;
a primary rotor assembly configured for rotation within the stator, wherein the primary rotor assembly is permeated by the motor fluid;
a primary shaft connected to the primary rotor assembly;
an internal magnetic coupling assembly inside the stator, wherein the internal magnetic coupling assembly comprises:
  a secondary rotor assembly configured for rotation within the stator, wherein the secondary rotor assembly is isolated from the motor fluid;
  a secondary shaft connected to the secondary rotor assembly;
  a liner in contact with an interior surface of the stator;
  a stand off connected to the liner; and
  a connecting flange connected to the stand off, wherein the connecting flange is configured to attach the motor to an adjacent component below the motor, wherein the connecting flange includes hydraulic ports configured to exchange the motor fluid with the adjacent component.

12. The motor of claim 11, wherein the primary shaft is connected to a primary driven component and the secondary shaft is connected to a secondary driven component.

13. The motor of claim 11, wherein the secondary rotor assembly is located within the liner.

14. The motor of claim 13, wherein the secondary shaft is located within the stand off.

15. The motor of claim 14, further comprising a cap connected to the liner.

* * * * *